United States Patent
Kim

(10) Patent No.: US 8,495,187 B2
(45) Date of Patent: Jul. 23, 2013

(54) APPARATUS AND METHOD FOR COORDINATELY MANAGING MEDIA CONTENT

(75) Inventor: Do-heon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1028 days.

(21) Appl. No.: 10/998,577

(22) Filed: Nov. 30, 2004

(65) Prior Publication Data

US 2005/0135341 A1 Jun. 23, 2005

(30) Foreign Application Priority Data

Dec. 18, 2003 (KR) ........................ 10-2003-0093194

(51) Int. Cl.
 *G06F 15/173* (2006.01)
 *G06F 15/16* (2006.01)
 *H04N 7/18* (2006.01)

(52) U.S. Cl.
 USPC ........... 709/223; 709/206; 709/208; 709/224; 725/74; 725/78; 725/80; 725/82

(58) Field of Classification Search
 USPC ................. 709/250, 218, 203–208, 217, 223, 709/226, 227, 229–231; 725/74, 78–83, 85
 See application file for complete search history.

(56) References Cited

U.S. PATENT DOCUMENTS

| | | | | |
|---|---|---|---|---|
| 7,085,814 | B1 * | 8/2006 | Gandhi et al. | 709/208 |
| 7,209,874 | B2 * | 4/2007 | Salmonsen | 703/23 |
| 8,205,235 | B2 * | 6/2012 | Hlasny et al. | 725/80 |
| 2002/0027569 | A1 * | 3/2002 | Manni et al. | 345/764 |
| 2002/0029256 | A1 * | 3/2002 | Zintel et al. | 709/218 |
| 2002/0083143 | A1 * | 6/2002 | Cheng | 709/208 |

(Continued)

FOREIGN PATENT DOCUMENTS

| | | |
|---|---|---|
| JP | 2003216620 A | 7/2003 |
| KR | 2003-0038924 A | 5/2003 |
| WO | WO 01/19084 A1 | 3/2001 |
| WO | WO 03/003658 A1 | 1/2003 |

OTHER PUBLICATIONS

Ritchie J et al:, "UPnP AV Architecture: 0.83" Jun. 12, 2002, Design Document Microsoft, p. 1-22, XP002271673.

Tokmakoff A et al., "Home Media Server Content Management" Proceedings of the SPIE, SPIE, Bellingham, VA, US, vol. 4519, Aug. 22, 2001, pp. 168-179, XP009017768.

*Primary Examiner* — Tae Kim

(74) *Attorney, Agent, or Firm* — Sughrue Mion, PLLC

(57) ABSTRACT

An apparatus that is connected to and controls a media server and a media renderer that is connected to a home network, stores and manages information regarding media content included in the media server, and provides a directory service with respect to all media content under a home network environment. The apparatus includes a media server directory module which stores and manages meta data of the media content comprised in all media servers existing under the home network environment and stores and manages connection information regarding the media servers. Also included is a proxy media server module which provides a content directory service, and a media server control point module which controls the media server directory module and the proxy media server module, searches for the media content, and brings and stores the meta data of the searched media content in the media server directory module.

12 Claims, 13 Drawing Sheets

U.S. PATENT DOCUMENTS

| | | | |
|---|---|---|---|
| 2002/0107850 A1* | 8/2002 | Sugimoto et al. | 707/3 |
| 2003/0046437 A1* | 3/2003 | Eytchison et al. | 709/250 |
| 2004/0003073 A1* | 1/2004 | Krzyzanowski et al. | 709/223 |
| 2004/0193609 A1* | 9/2004 | Phan et al. | 707/10 |
| 2005/0086355 A1* | 4/2005 | Deshpande | 709/231 |
| 2005/0108766 A1* | 5/2005 | Hlasny et al. | 725/100 |

* cited by examiner

APPARATUS AND METHOD FOR COORDINATELY MANAGING MEDIA CONTENT

CROSS-REFERENCE TO RELATED APPLICATIONS

This application claims priority from Korean Patent Application No. 10-2003-0093194 filed on Dec. 18, 2003 in the Korean Intellectual Property Office, the disclosure of which is incorporated herein in its entirety by reference.

BACKGROUND OF THE INVENTION

1. Field of the Invention

Apparatuses and methods consistent with the present invention relate to coordinately managing multimedia content, and more particularly, to an apparatus and method for allowing a user to coordinately manage media content possessed by media server devices, which exist in various types at various locations on a Universal Plug and Play (UPnP) network within a home, using a Home Media Content Directory (HMCD) device.

2. Description of the Related Art

Generally, a home network is implemented by a private network based on an Internet Protocol (IP). A variety of machines such as all types of personal computers (PC), intelligent devices, and wireless devices, which are used within a home, are connected and controlled through the home network based on a virtual common computing environment referred to as middleware.

Middleware connects various digital devices in peer-to-peer so that the digital devices communicate with each other. Home Audio/Video Interoperability (HAVI), UPnP, Java intelligent network infra-structure (Jini), Home Wide Web (HWW), etc. have been suggested as middleware.

Particularly, under a computing environment constructed through UPnP middleware, each device is allocated an address by a server according to a Dynamic Host Configuration Protocol (DHCP) or by automatic IP configuration (Auto IP) so that communication between devices and search/inquiry over the devices are performed.

A UPnP network includes a home network device (hereinafter, referred to as a controlled device), which is connected to an IP-based home network and controlled, and a control point, which is a device controlling the controlled device.

FIGS. 1A through 1D illustrate operations in a conventional procedure for control between home network devices. A conventional procedure for control between devices on a UPnP network includes a discovery operation, a description operation, a control operation, and an eventing operation.

FIG. 1A illustrates a discovery operation. The discovery operation can be divided into an advertisement, in which a new controlled device 500 is connected to a home network having a UPnP control point and advertises itself to the other devices on the home network, and a discovery, in which a new control point 510 is connected to the home network and searches for controlled devices that operate on the home network. Through the discovery operation, a control point can search for controlled devices to be controlled.

First, during the advertisement, a new controlled device 500 connected to a network is allocated to a predetermined IP address using a search protocol, i.e., a DHCP, or Auto IP feature according to an addressing process and multicasts an advertisement message to all controlled devices 502, 503 and control points on the network using the allocated address to report a service provided through the new controlled device. Then, a control point that wants to control the new controlled device registers the new controlled device as an object to be controlled in response to the multicast advertisement message.

Second, during the discovery, in a state where controlled devices have been allocated a unique Uniform Resource Locator (URL) through addressing, a new control point 510 connected to a network is allocated to a predetermined IP address using a search protocol, i.e., a DHCP, or Auto IP feature according to an addressing process and multicasts a search message using the allocated IP address according to a search protocol, i.e., a Simple Service Discovery Protocol (SSDP) to identify controlled devices that operate on the network. Then, a controlled device 501 unicasts a response message to the control point 510 that searches for the controlled device in response to the search message. The control point 510 receives the response message and registers the controlled device 501.

FIG. 1B illustrates a description operation in which a control point 520 checks a service description Extensible Markup Language (XML) file or a device description XML file using an IP address of a new controlled device 530, which is obtained during the discovery operation, and analyzes in detail functions of the new controlled device in order to control the controlled device. In other words, a control point that will control a new controlled device requests a device description XML file or a service description XML file from the new controlled device, receives a description XML file (e.g., UPnP description for a device or a UPnP description for a service) from the new controlled device, and parses the received description XML file. After analyzing a device description, the control point parses each service description included in the device description. In other words, the description operation is a process of reading a service template XML provided by each device and analyzing what command a control point can issue for a particular device.

FIG. 1C illustrates a control operation. When a control point 540 provides a particular service through a desired controlled device 550, the control point transmits a control message, i.e., an action request, requesting the particular service defined in a service template to the desired controlled device using a simple object access protocol (SOAP) according to a UPnP device architecture and receives a response message including a result and a variable value, thereby directly controlling the desired controlled device. The control message and the response message are transmitted and received using an IP address of the desired controlled device obtained through addressing and discovery operations and are expressed in XML using the SOAP.

FIG. 1D illustrates an eventing operation of checking an information changed state of a controlled device 560 that has provided a particular service in response to a control command transmitted from a control point 570. In other words, a control point transmits a message, i.e., a subscription request, requesting a subscription to a desired controlled device in order to check an information changed state of the desired controlled device. Then, the desired controlled device transmits an event message, formatted in XML through a Generic Event Notification Architecture (GENA) whenever its internal state is changed, to all of the registered control points in order to report changed information. Each control point receives the event message from the controlled device and updates a description for the controlled device.

FIG. 2 illustrates a configuration of a UPnP AV home network. As shown in FIG. 2, the UPnP AV home network includes media servers 1, 2 providing media content, media renderers 3, 4 playing back media content, and a control point (CP) 5 allowing a user to control the media server and the media renderer. All UPnP actions between the CP and each of the media servers and the media renders are performed using a HyperText Transfer Protocol (HTTP), and streaming of media content from a media server to a media renderer is performed using an out-of-band transfer protocol. Each of UPnP AV devices (i.e., the media servers and the media renderers) can inform the CP of its existence through the home network. The CP can search for desired UPNP AV devices (i.e., a media server and a media renderer) and control the media renderer to play back media content provided by the media server.

FIG. 3 illustrates an architecture among UPnP AV devices and a UPnP AV CP for playback of media content. A media server 6 includes a content directory functioning as a database (DB) which stores and manages information regarding media content, a connection manager serving to connect the media server to a media renderer, and an AV transport serving to transmit information. Also, a media renderer 7 includes a rendering control performing playback control, a connection manager serving to connect the media renderer to the media server, and an AV transport serving to transmit information.

In an operation of playing back media content, the CP requests information regarding media content from the media server. Then, the media server retrieves the information and transmits it in an XML message to the CP. Upon receiving the XML message, the CP controls the media renderer to play back the media content. However, a conventional UPnP AV device has a problem in that it does not efficiently provide information regarding media content to a media CP or a user.

On a home network, a plurality of media servers providing media content may be located at different places in different types. In this situation, a CP or a user needs to search all of the media server and browse or search media content managed by each media server for desired media content. Thereafter, if the user does not remember the exact location of the desired media content, the above-described operation needs to be repeated to play back the desired media content. In addition, when media content that the user wants to manage on a single list is not included in a single media server but is dispersed in a plurality of media servers, the user cannot operate list management if the CP does not provide a coordination management function.

Further, since it is not guaranteed that a user uses only a particular CP when controlling a plurality of UPnP AV devices, even if the particular control point manages a list of media content items, the user cannot view the list of media content items when he/she uses a CP other than the particular CP.

Moreover, to provide various functions through a home network, each media server on the home network needs to provide the various functions. In other words, if one media server provides browse and search functions and another media server provides only the browse function, a user will encounter the above-mentioned problems.

SUMMARY OF THE INVENTION

An exemplary embodiment of the present invention provides an apparatus and method for coordinately and efficiently providing information regarding media content within media servers, which exist in various types at various locations on a home network, to a control point or a user so that the control point or the user can control and manage all media content provided by the media servers as if all of the media content is provided by a single device and a variety of functions can be provided to the user through a media server that has only restricted fundamental functions.

According to an exemplary aspect of the present invention, there is provided an apparatus for coordinately managing media content. The apparatus is connected to and controls a media server and a media renderer that are connected to a home network, stores and manages information regarding media content included in the media server, and provides a directory service with respect to all media content under a home network environment.

The apparatus may include a media server directory module which stores and manages meta data of the media content comprised in all media servers existing under the home network environment and stores and manages connection information regarding the media servers, a proxy media server module which provides a content directory service using the meta data of the media content managed by the media server directory module, and a media server control point module which controls the media server directory module and the proxy media server module, searches for the media content comprised in all of the media servers, and brings and stores the meta data of the searched media content in the media server directory module.

According to another exemplary aspect of the present invention, there is provided a method of coordinately managing media content, comprising a media server control point module searching for information regarding media content; providing the searched information to a content directory service database layer; and the content directory service database layer providing the searched information to a proxy content directory service section.

According to still another exemplary aspect of the present invention, there is provided a method of coordinately managing media content, comprising a proxy content directory service section receiving a request for information regarding a content directory service, the proxy content directory service section transmitting the request to a content directory service database layer, the content directory service database layer computing a result of requesting the information regarding the content directory service, and reporting a computation result to the proxy content directory service section.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY, NON-LIMITING EMBODIMENTS OF THE INVENTION

An exemplary embodiment of the present invention will now be described in detail with reference to the accompanying drawings.

Figure 1A:
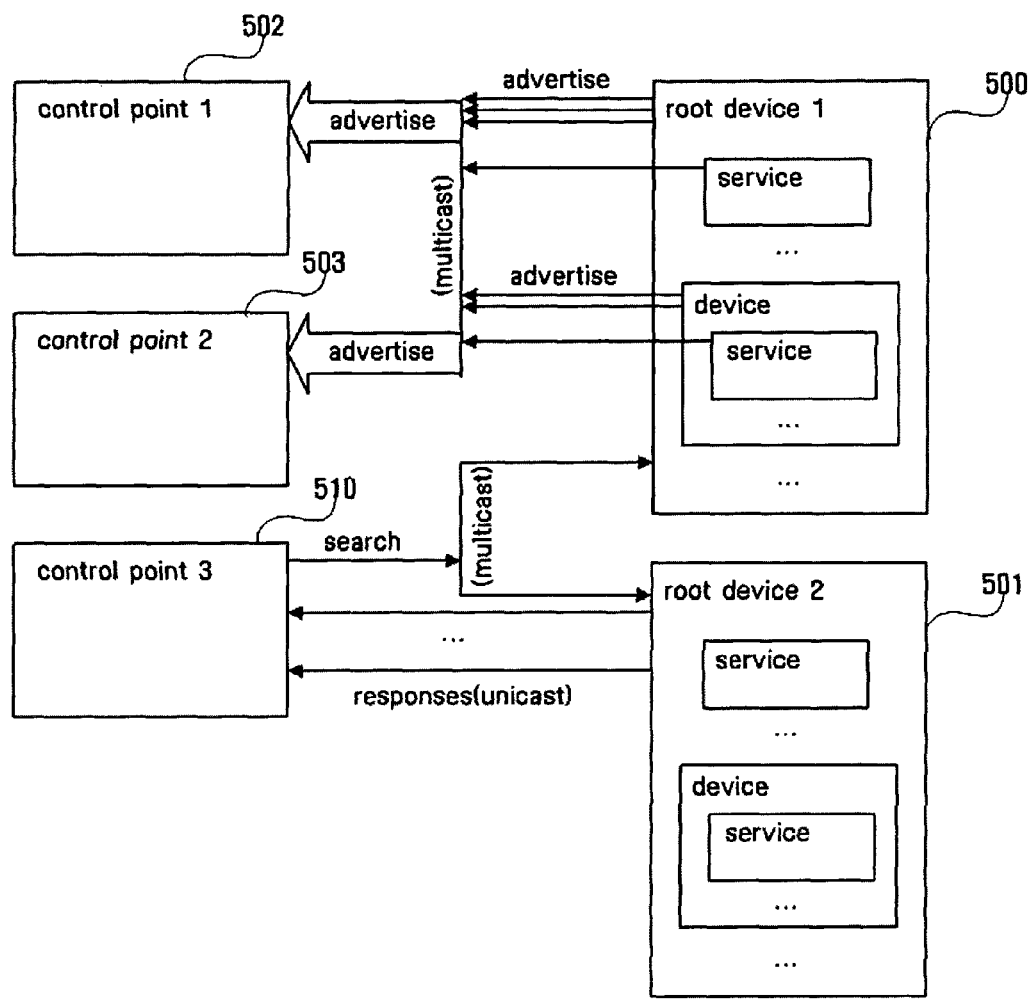
FIGS. 1A, 1B, 1C and 1D illustrate operations in a conventional procedure for control between home network devices.
Figure 1B:
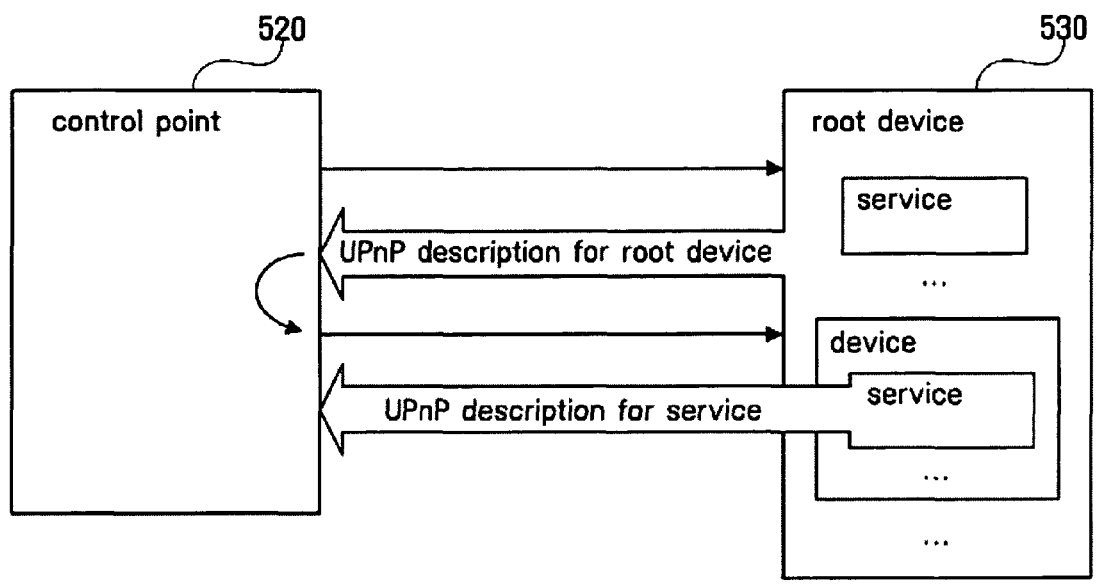
Figure 1C:
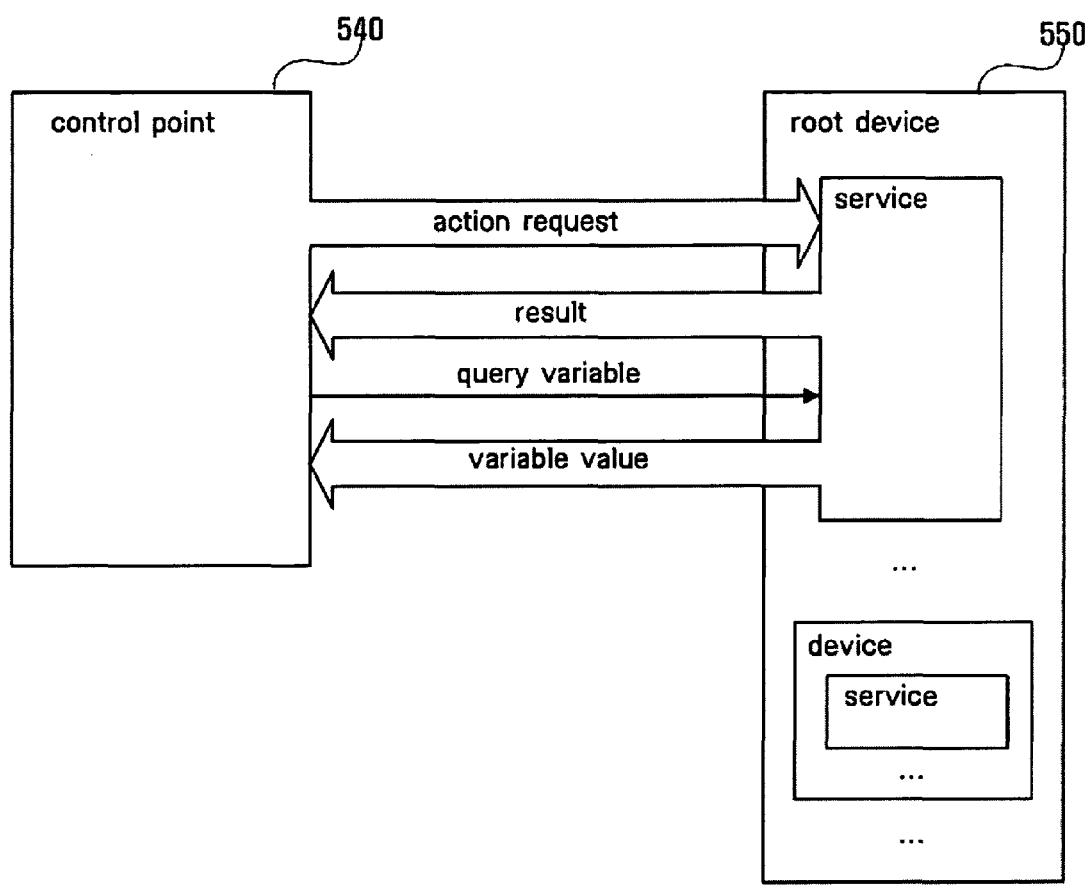
Figure 1D:
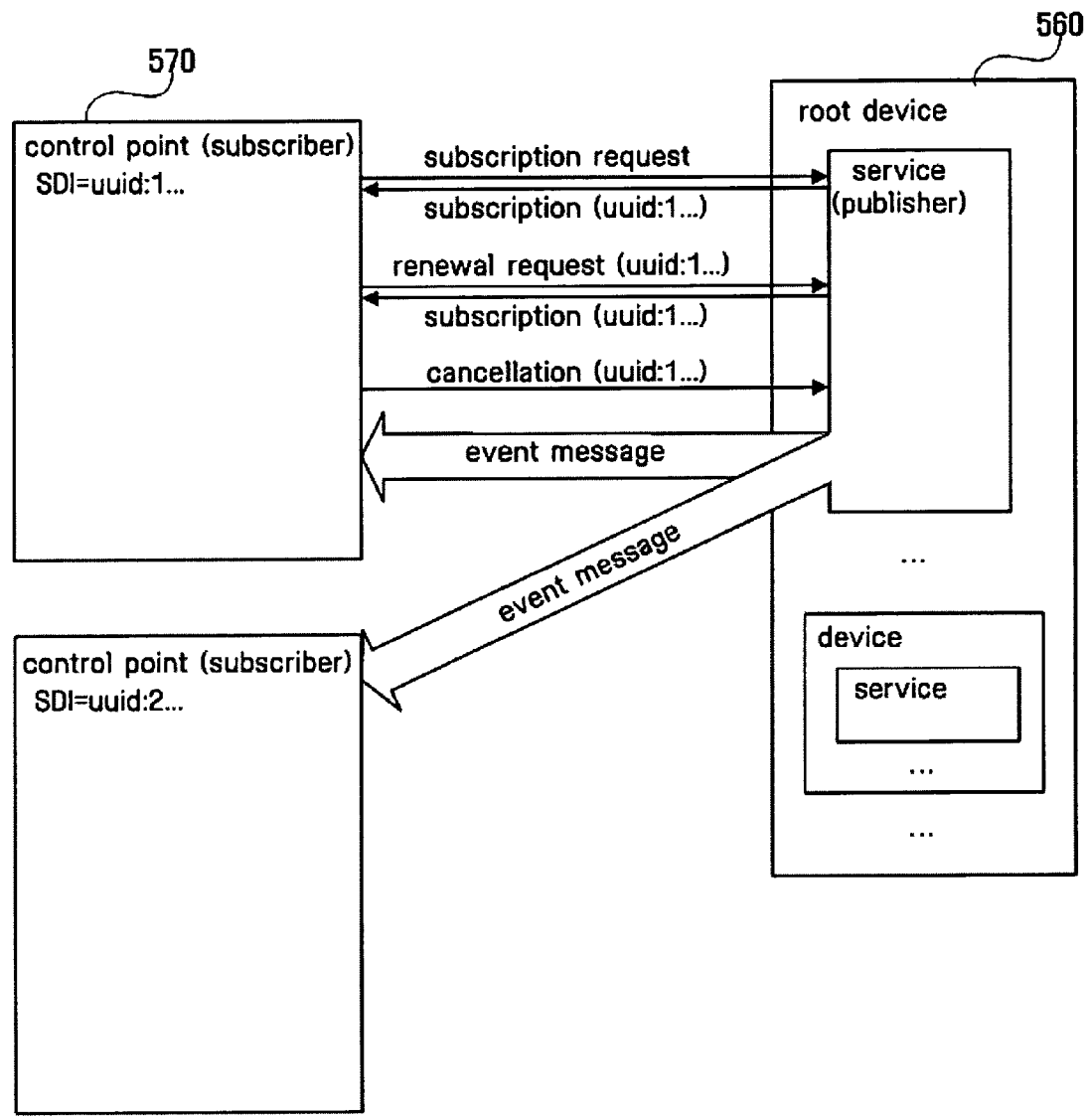
Figure 2:
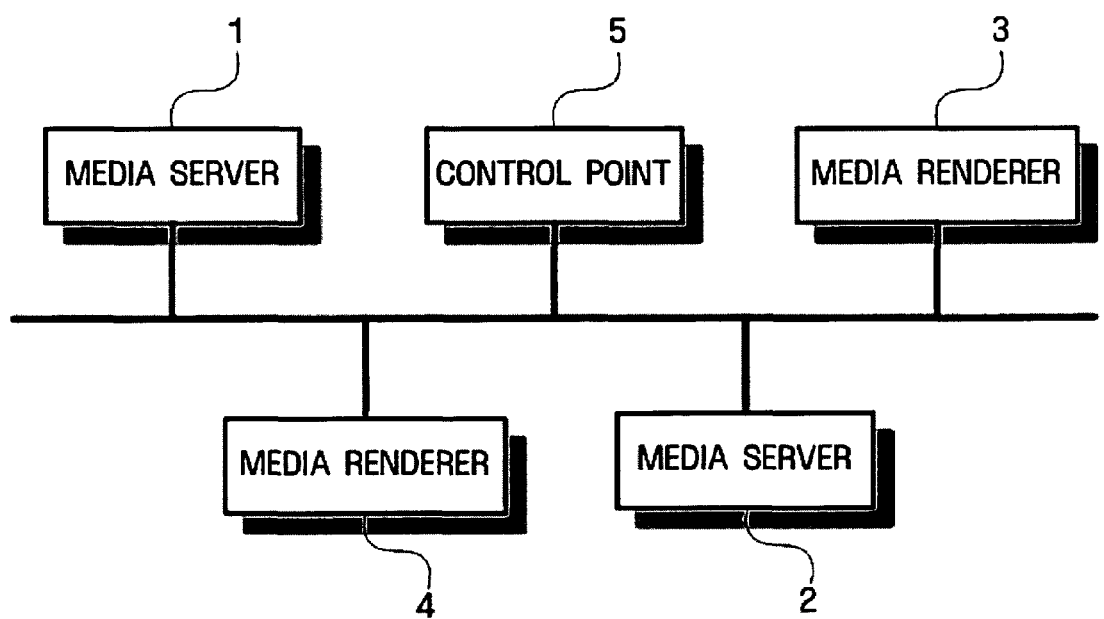
FIG. 2 illustrates a configuration of a Universal Plug and Play (UPnP) AV home network.
Figure 3:
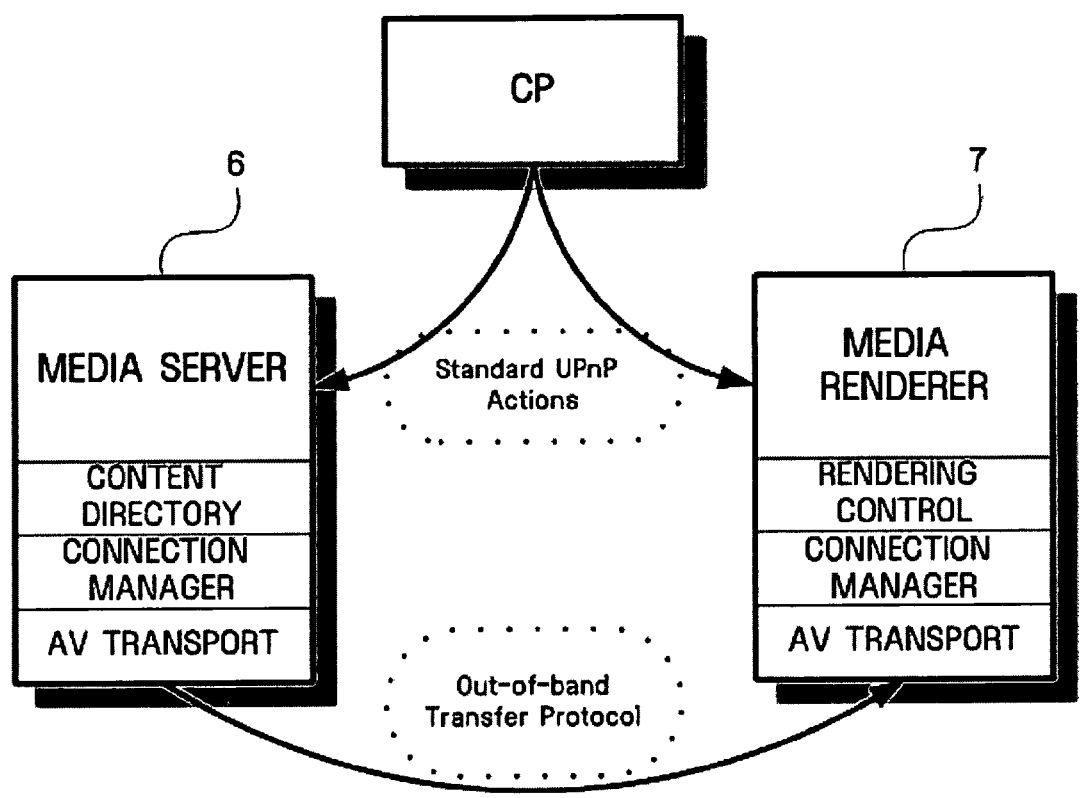
FIG. 3 illustrates an architecture among UPnP AV devices and a UPnP AV control point (CP) for playback of media content.
Figure 4:
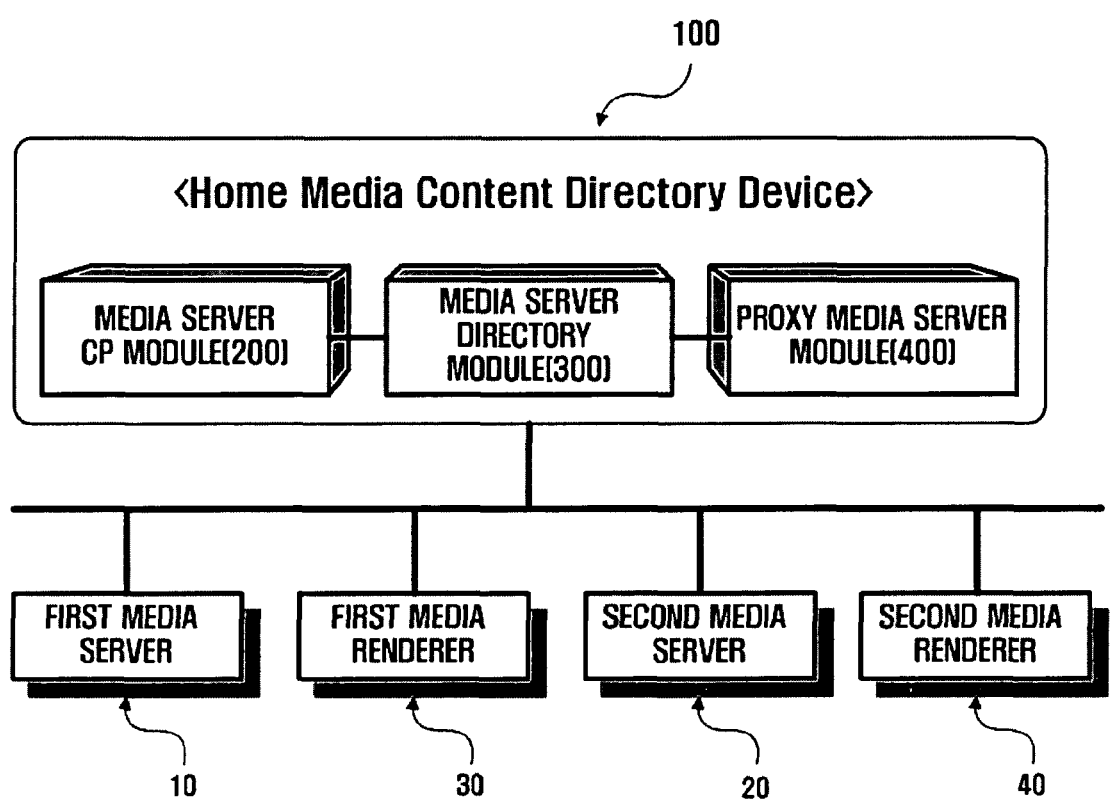
FIG. 4 illustrates a configuration of a home network including a Home Media Content Directory (HMCD) device according to an exemplary embodiment of the present invention.

FIG. 4 illustrates a configuration of a home network including a Home Media Content Directory (HMCD) device according to an exemplary embodiment of the present invention. An HMCD device 100 includes a media server control point (CP) module 200, a media server directory module 300, and a proxy media server module 400. In a home network environment, a first media server 10, a second media server 20, and a first media renderer 30, and a second media renderer 40 are present together with the HMCD device 100. In addition, although not shown in FIG. 4, a CP, which controls controlled devices (referred to as CDs, hereinafter) such as media renderers capable of playing back media files and media servers, is present.

The media server CP module 200 within the HMCD device 100 retrieves meta data of media content included in the first and second media servers 10 and 20 in response to a command of a user or a CP, and stores and manages the meta data in the media server directory module 300. The proxy media server module 400 provides a coordination environment of a list of media content included in the first and second media servers 10 and 20 to the user using the meta data.

In other words, the media server directory module 300 stores and manages meta data of media content existing in all media servers within the home network environment and connection information regarding the media servers. Here, the connection information indicates information regarding a connection manager service and an audio/video (AV) transport service which are provided by the media servers.

The proxy media server module 400 provides a content directory service, a connection manager service, and an AV transport service using the meta data regarding the media content managed by the media server directory module 300. The media server CP module 200 controls the media server directory module 300 and the proxy media server module 400, searches for media content existing in all of the media servers, brings meta data regarding the searched media content, and stores the meta data in the media server directory module 300.

Here, meta data regarding media content defines or describes a predetermined media file included in the media content. In other words, meta data indicates tag information including a storage location of a media file, a file name, a file type, a genre, a track number, etc. Accordingly, the media server directory module 300 does not store a real media file but stores and manages meta data regarding the real media file. When the media file is wanted to be played back, the meta data regarding the media file is transmitted to a media renderer through the proxy media server module 400. Then, the media render receives the media file corresponding to the meta data through streaming from a media server that actually stores the media file based on the meta data and plays back the media file.

Figure 5:
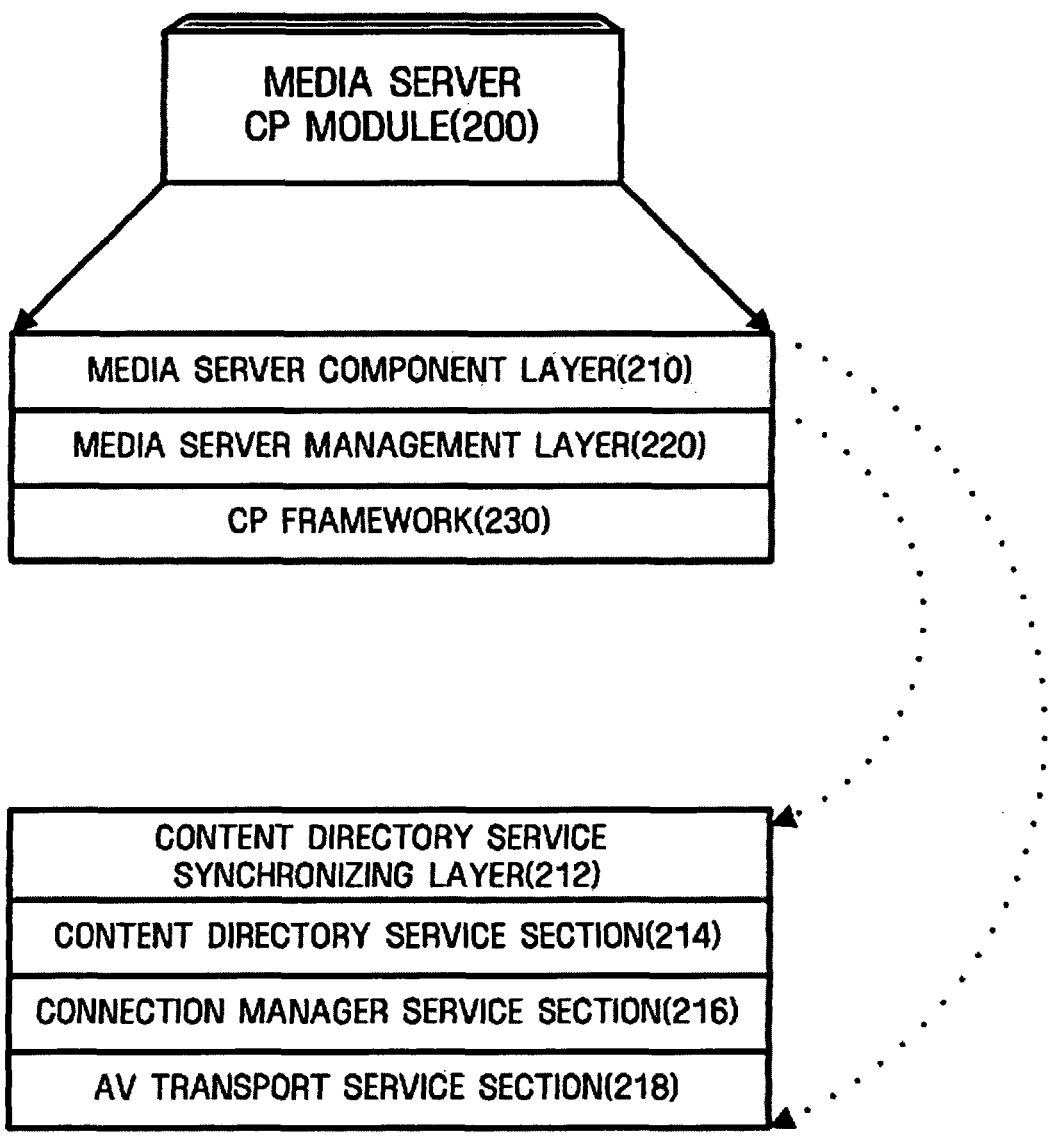
FIG. 5 illustrates a configuration of a media server CP module and a configuration of a media server component layer included in the media server CP module, according to an exemplary embodiment of the present invention.

FIG. 5 illustrates a configuration of the media server CP module 200 shown in FIG. 4 and a configuration of a media server component layer included in the media server CP module 200, according to an exemplary embodiment of the present invention.

The media server CP module 200 includes a media server component layer 210, a media server management layer 220, and a CP framework 230. The media server management layer 220 manages and monitors a state of each of all media servers existing on the home network shown in FIG. 4, and information regarding a CP component corresponding to each of the media servers to the media server component layer 210. In addition, the media server management layer 220 transmits a search message to all of the media servers existing on the home network using the CP framework 230 and transmits the information regarding the CP component corresponding to each of the media servers to the media server component layer 210 according to a result of receiving a response message from each of the media servers. The media server management layer 220 also senses a particular media server's login to or logout from the home network and reports a sensed result to the media server component layer 210.

The media server component layer 210 generates and manages the CP component corresponding to each of the media servers based on the information regarding the CP component received from the media server management layer 220 and controls a content directory service, a connection manager service, and an AV transport service which are provided by a media server corresponding to the CP component. Here, the connection manager service is related with connection between a media server and a media renderer, and the AV transport service is related with transmission of streaming of a media file.

As shown in FIG. 5, the media server component layer 210 includes a content directory service synchronizing layer 212, a content directory service section 214, a connection manager service section 216, and an AV transport service section 218. The content directory service synchronizing layer 212 synchronizes a structure of media content provided by all of the media servers with meta data regarding media content stored in a content directory service database (DB) layer 310 (FIG. 6) within the media server directory module 300.

The content directory service section 214 controls a content directory service function provided by a media server corresponding to a particular CP component within the media server component layer 210. The connection manager service section 216 controls a connection manager service function provided by a media server corresponding to a particular CP component within the media server component layer 210.

The AV transport service section 218 controls an AV transport service function provided by a media server corresponding to a particular CP component within the media server component layer 210. The CP framework 230 transmits a command of the media server CP module 200 to one of the media servers existing on the network so that the media server CP module 200 can function as a usual CP which controls media servers in a home network environment.

Figure 6:
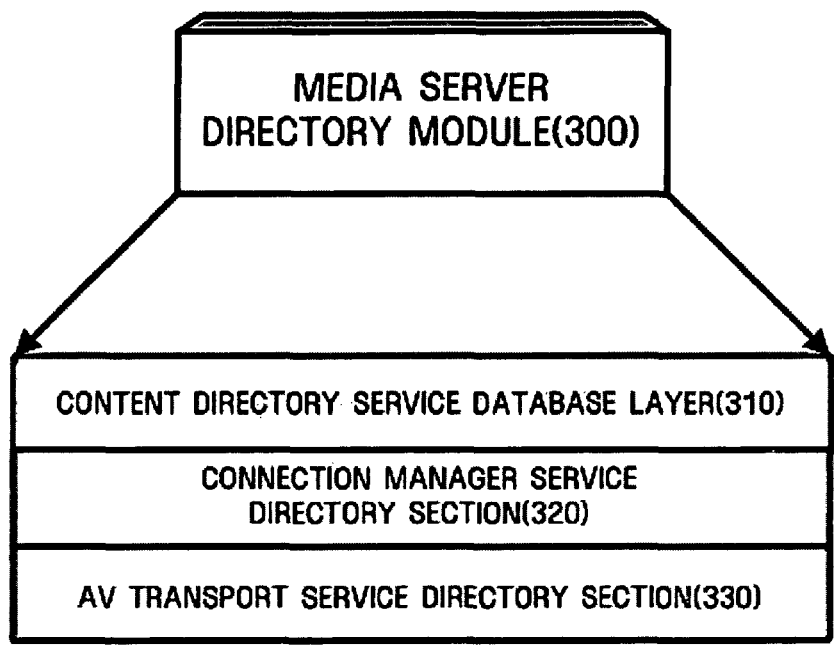
FIG. 6 illustrates a configuration of a media server directory module according to an exemplary embodiment of the present invention.

FIG. 6 illustrates a configuration of the media server directory module 300 shown in FIG. 4, according to an exemplary embodiment of the present invention. The media server directory module 300 includes a content directory service DB layer 310, a connection manager service directory section 320, and an AV transport service directory section 330.

The content directory service DB layer 310 stores and manages meta data of media content existing in all media servers on the home network and updates the meta data when the media content is changed. The update is performed by the content directory service synchronizing layer 212.

Meanwhile, the meta data is divided into containers and items when managed. Based on the information regarding the meta data, a user or a CP can generate a new item or a new container and can also provide all functions that the content directory service can support. The connection manager service directory section 320 manages information regarding a connection manager service provided by each of the media servers and provides the information regarding the connection manager service to the proxy media server module 400. The AV transport service directory section 330 manages information regarding an AV transport service provided by each of the media servers and provides the information regarding the AV transport service to the proxy media server module 400.

Figure 7:
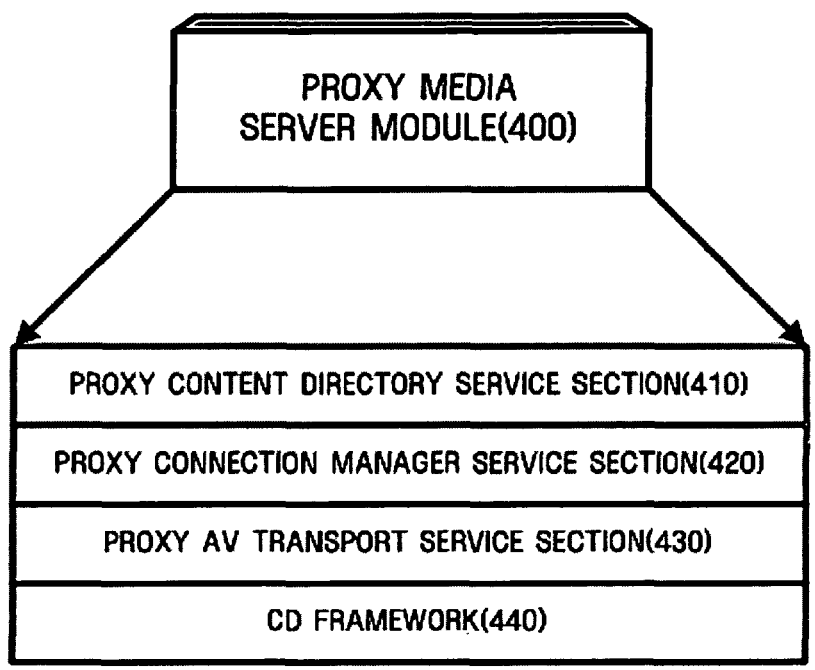
FIG. 7 illustrates a configuration of a proxy media server module according to an exemplary embodiment of the present invention.

FIG. 7 illustrates a configuration of the proxy media server module 400 shown in FIG. 4, according to an exemplary embodiment of the present invention. The proxy media server module 400 includes a proxy content directory service section 410, a proxy connection manager service section 420, a proxy AV transport service section 430, and a controlled device (CD) framework 440.

The proxy content directory service section 410 provides a content directory service function according to meta data of the media content that is stored and managed by the content directory service DB layer 310.

The proxy connection manager service section 420 provides a connection manager service function based on information regarding a connection manager service, which is provided by the connection manager service directory section 320. The proxy AV transport service section 430 provides an AV transport service function based on information regarding an AV transport service, which is provided by the AV transport service directory section 330.

The CD framework 440 transmits a command of the proxy media server module 400 to a media renderer on the home network or a control point on the home network. A user or a CP is inclined to use functions of a media server, i.e., a normal CD when a service is provided by the proxy media server module 400. However, since the proxy content directory service section 410 provides meta data of media content included in all media servers existing on a home network, even when media content included in a media server having limited functions is used, all functions provided by all of the media servers can be used through the proxy content directory service section 410.

Figure 8A:
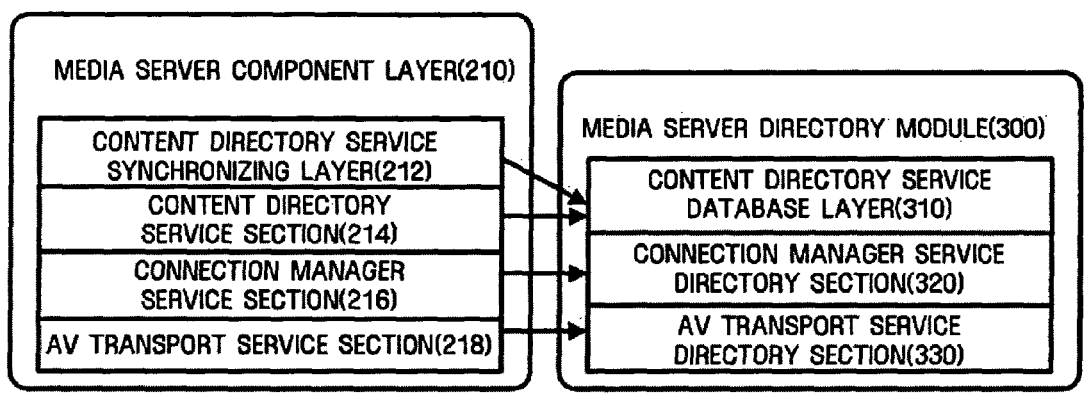
FIG. 8A illustrates an operational relationship between a media server component layer and a media server directory module, according to an exemplary embodiment of the present invention.

FIG. 8A illustrates an operational relationship between the media server component layer 210 and the media server directory module 300, according to an exemplary embodiment of the present invention. The content directory service synchronizing layer 212 and the content directory service section 214 browse media content included in each of all media servers existing on a home network and stores meta data of the media content in the content directory service DB layer 310.

Here, an event of each media server is checked, or a content directory service state of each media server is periodically checked, so that when a directory of media content has been changed, the content directory service synchronizing layer 212 can update the meta data with the changed information.

Meanwhile, when a connection manager service and an AV transport service are added through a component, the connection manager service section 216 provides information regarding the added connection manager service to the connection manager service directory section 320, and the AV transport service section 218 provides the AV transport service to the AV transport service directory section 330, so that an update can be performed.

Figure 8B:
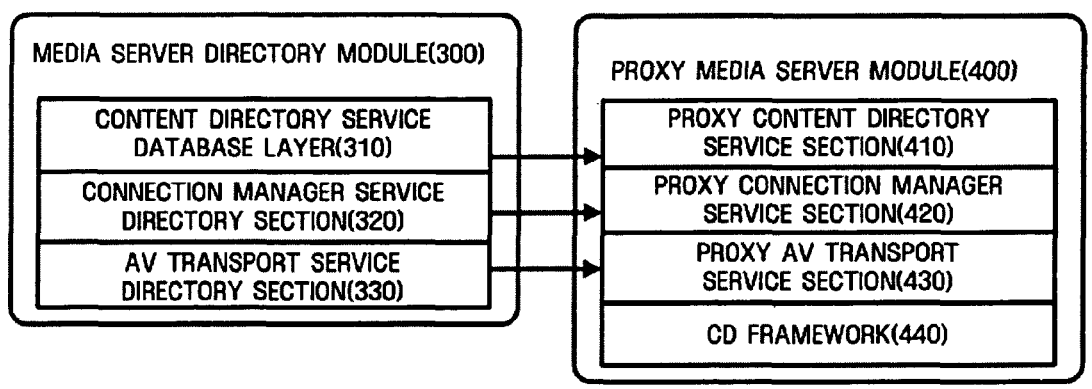
FIG. 8B illustrates an operational relationship between a media server directory module and a proxy media server module, according to an exemplary embodiment of the present invention.

FIG. 8B illustrates an operational relationship between the media server directory module 300 and the proxy media server module 400, according to an exemplary embodiment of the present invention.

The content directory service DB layer 310 provides all meta data of a content directory service to the proxy content directory service section 410. The proxy content directory service section 410 receives the meta data of the content directory service and allows a user or a CP to systematically manage media content using the received meta data.

Meanwhile, the connection manager service directory section 320 and the AV transport service directory section 330 provide information to the proxy connection manager service section 420 and the proxy AV transport service section 430, respectively, so that the proxy connection manager service section 420 and the proxy AV transport service section 430 can provide the connection manager service and the AV transport service, respectively.

Figure 9:
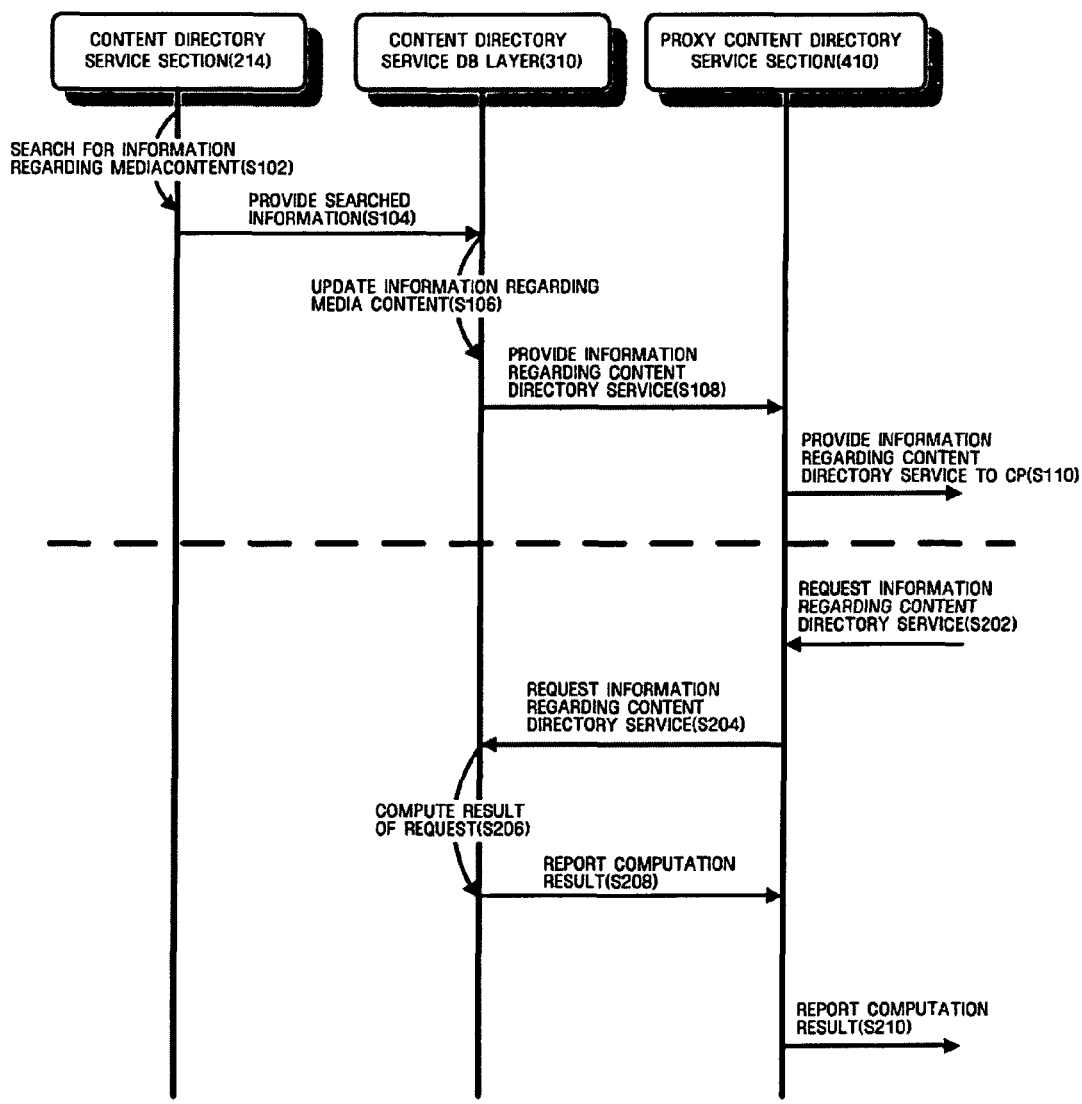
FIG. 9 illustrates a procedure of processing a content directory service according to an exemplary embodiment of the present invention.

FIG. 9 illustrates a procedure of processing a content directory service according to an exemplary embodiment of the present invention. In a partial procedure illustrated above a dotted line in FIG. 9, the content directory service section 214 of the media server CP module 200 searches for information regarding media content in step S102. The searched information is provided to the content directory service DB layer 310 in step S104.

Meanwhile, when information regarding media content existing in all media servers on a home network is changed, the content directory service DB layer 310 updates the information regarding the media content based on the changed information in step S106. The content directory service DB layer 310 provides the information regarding the media content to the proxy content directory service section 410 in step S108. Here, the information regarding the media content is meta data of the media content.

Then, the proxy content directory service section 410 provides a content directory service function to a user or a CP according to the meta data of the media content. In another partial procedure illustrated below the dotted line in FIG. 9, the proxy content directory service section 410 receives a request for information regarding a content directory service in step S202.

Then, the proxy content directory service section 410 transmits the request to the content directory service DB layer 310 in step S204. Then, the content directory service DB layer 310 computes a result of requesting the information regarding the content directory service in step S206.

The content directory service DB layer 310 reports a computation result to the proxy content directory service section 410 in step S208. Then, the proxy content directory service section 410 reports the computation result to the user or the CP in step S210.

While the present invention has been particularly shown and described with reference to exemplary embodiments thereof, it will be understood by those of ordinary skill in the art that various changes in form and details may be made therein without departing from the spirit and scope of the present invention as defined by the following claims.

As described above, according to an exemplary embodiment of the present invention, a CP or a user can efficiently and coordinately manage information regarding media content included in all media servers existing on a home network.

In detail, first a user does not need to memorize a media server in which media content of interest should be stored or a media server in which media content of interest to be played back should be found out, but the user can integrate media content managed by all media servers on a home network into a single album, genre, or playback list according to the user's taste .

Second, a media server having only a browse function can be provided with a variety of functions of a content directory service by using an HMCD device.

What is claimed is:

1. An apparatus for managing media content, the apparatus being connected to and controlling a first media server and a media renderer, which are connected to a home network, the apparatus storing and managing information regarding media content in the first media server, and providing a directory service with respect to media content under a home network environment, the apparatus comprising:

a media server directory module which stores and manages meta data of the media content in media servers existing under the home network environment and which stores and manages connection information regarding the media servers, the media servers comprising the first media server that provides a first service of a content directory service of the first media server for accessing the media content;

a proxy media server module which provides all services of a content directory service of the media servers for accessing the media content using the meta data of the media content managed by the media server directory module and which transmits meta data corresponding to media content to be played back by a media renderer to the media renderer if the media content to be played back is requested to be played back, the services of the content directory service of the media servers comprising the first service and a second service unsupported by the first media server for accessing the media content and the media renderer receiving the media content to be played back from the first media server that stores the media content based on the meta data received from the proxy media server module; and a media server control point module which controls the media server directory module and the proxy media server module, searches for the media content comprised in all of the media servers, and retrieves and stores the meta data of searched media content in the media server directory module, wherein the media server control point module comprises:

a media server management layer which manages and monitors a state of each of the media servers existing on the home network and transmits information regarding a control point component corresponding to each media server to a media server component layer;

a media server component layer which generates a control point component corresponding to each media server according to the information regarding to the control point component received from the media server management layer, manages the generated control point component, and controls a content directory service, a connection manager service, and an audio or video transport service which are provided by the media servers; and a control point framework which transmits a command of the media server control point module to one of the media servers on the home network, wherein the connection information is information that identifies a connection manager service related with a connection between the media servers and the media renderer and an audio or video transport service related with transmission of streaming of the media content between the media servers and the media renderer which are provided by each of the media servers, wherein at least one of the media server directory module, the proxy media server module and the media server control point module is implemented by a processor, and wherein the first service comprises a browse function and the second service comprises a search function.

2. The apparatus of claim 1, wherein the media server management layer transmits a search message to all of the media servers existing on the home network using the control point framework and transmits the information regarding the control point component corresponding to each media server to the media server component layer according to a result of receiving a message, which is transmitted by a media server supporting the search function, responding to the search message.

3. The apparatus of claim 1, wherein the media server management layer senses a particular media server login to or logout from the home network and reports a sensed result to the media server component layer.

4. The apparatus of claim 1, wherein the media server component layer comprises:

a content directory service synchronizing layer which synchronizes the media content provided by all of the media servers with the meta data of the media content, which is stored in a content directory service database layer within the media server directory module;

a content directory service section which controls a content directory service function provided by a media server corresponding to a particular control point component within the media server component layer;

a connection manager service section which controls a connection manager service function provided by a media server corresponding to a particular control point component within the media server component layer; and an audio or video transport service section which controls an audio or video transport service function provided by a media server corresponding to a particular control point component within the media server component layer.

5. The apparatus of claim 1, wherein the media server directory module comprises:

a content directory service database layer which stores and manages the meta data of the media content comprised in the media servers existing under the home network environment and updates the meta data;

a connection manager service directory section which manages information regarding a connection manager service provided by the media servers and provides the information regarding the connection manager service to the proxy media server module; and an audio or video transport service directory section which manages information regarding an audio or video transport service provided by the media servers and provides the information regarding the audio or video transport service to the proxy media server module.

6. The apparatus of claim 5, wherein the content directory service database layer updates the meta data according to an operation of a content directory service synchronizing layer which synchronizes the media content provided by the media servers with the meta data of the media content, which is stored in the media server directory module.

7. The apparatus of claim 5, wherein the meta data is divided into containers and items when managed.

8. A method of managing media content located on devices of a home network using a content directory device, the method comprising:

searching for information regarding media content stored on the devices using a media server control point module of the content directory device, the devices comprising a first media server that provides a first service of a content directory service of the first media server for accessing media content;

providing the searched for information to a media server directory module comprising a content directory service database layer; and providing the searched for information to a proxy media server module comprising a proxy content directory service section using the content directory service database layer, the proxy media server module providing all services of a content directory service of the devices of the home network for accessing the media content and transmitting meta data corresponding to the media content to be played back by a media renderer to the media renderer if the media content to be played back is requested to be played back, the services of the content directory service of the devices of the home network comprising the first service and a second service unsupported by the first media server for accessing the media content and the media renderer receiving the media content to be played back from a media server that stores the media content based on the meta data received from the proxy media server module, wherein the media server control point module further comprises:

a media server management layer which manages and monitors a state of each of the media servers existing on the home network and transmits information regarding a control point component corresponding to each media server to a media server component layer;

a media server component layer which generates a control point component corresponding to each media server according to the information regarding to the control point component received from the media server management layer, manages the generated control point component, and controls a content directory service, a connection manager service, and an audio or video transport service which are provided by the media servers; and a control point framework which transmits a command of the media server control point module to one of the media servers on the home network, wherein the information regarding to the control point component is information that identifies a connection manager service related with a connection between the media servers and the media renderer and an audio or video transport service related with transmission of streaming of the media content between the media servers and the media renderer which are provided by each of the media servers, and wherein the first service comprises a browse function and the second service comprises a search function.

9. The method of claim 8, wherein when information regarding media content in media servers existing in a home network environment is changed after providing the searched for information, which is transmitted by a media server supporting the search function, to the content directory service database layer, the content directory service database layer updates the searched information with the changed information.

10. The method of claim 8, wherein the information is meta data of the media content.

11. The method of claim 8, wherein the proxy content directory service section provides a content directory service function according to meta data of the media content.

12. A method of managing media content located on devices of a home network using a content directory device, comprising:

receiving at a proxy content directory service section of the content directory device a request for information regarding a content directory service;

transmitting from the proxy content directory service section the request to a content directory service database layer;

computing at the content directory service database layer a result of the request for information regarding the content directory service; and reporting a computation result to the proxy content directory service section, wherein the computing comprises:

searching for information regarding media content of the devices using a media server control point module, the devices comprising a first media server that provides a first service of a content directory service of the first media server for accessing the media content of the first media server;

providing the searched for information to a media server directory module comprising the content directory service database layer; and providing the searched for information to a proxy media server module comprising the proxy content directory service section using the content directory service database layer, the proxy media server module providing all services of a content directory service of the devices of the home network for accessing the media content of the first media server and transmitting meta data corresponding to media content to be played back by a media renderer to the media renderer if the media content to be played back is requested to be played back, the services of the content directory service of the devices of the home network comprising the first service and a second service unsupported by the first media server for accessing the media content of the first media server and the media renderer receiving the media content to be played back from the first media server that stores the media content based on the meta data received from the proxy media server module, and wherein the media server control point module comprises:

a media server management layer which manages and monitors a state of each of the media servers existing on the home network and transmits information regarding a control point component corresponding to each media server to a media server component layer;

a media server component layer which generates a control point component corresponding to each media server according to the information regarding to the control point component received from the media server management layer, manages the generated control point component, and controls a content directory service, a connection manager service, and an audio or video transport service which are provided by the media servers; and a control point framework which transmits a command of the media server control point module to one of the media servers on the home network, wherein the information regarding to the control point component is information that identifies the connection manager service related with a connection between the media servers and the media renderer and the audio or video transport service related with transmission of streaming of the media content between the media servers and the media renderer which are provided by each of the media servers, and wherein the first service comprises a browse function and the second service comprises a search function.

\* \* \* \* \*